United States Patent [19]

Rasen et al.

[11] 4,342,807
[45] Aug. 3, 1982

[54] LOW DENSITY MATTING AND PROCESS

[75] Inventors: Alfred Rasen; Rolf Vollbrecht; Klemens Schenesse, all of Obernburg/Main; Joachim Behnke, Miltenberg, all of Fed. Rep. of Germany

[73] Assignee: Akzona Incorporated, Asheville, N.C.

[21] Appl. No.: 117,980

[22] Filed: Feb. 4, 1980

Related U.S. Application Data

[62] Division of Ser. No. 703,277, Jul. 7, 1976, Pat. No. 4,252,590.

[30] Foreign Application Priority Data

Jul. 9, 1975 [DE] Fed. Rep. of Germany ....... 2530499

[51] Int. Cl.³ .................... B32B 3/28; B32B 27/02
[52] U.S. Cl. .................................. 428/180; 428/182; 428/222; 428/288; 428/296
[58] Field of Search ............ 156/209, 62.4, 167, 156/181, 62.8, 62.2, 244.26, 304.6, 168, 176, 178, 179; 428/296, 903, 180, 182, 174, 175, 92, 115, 171, 72, 73, 286, 287, 198, 302, 172, 317, 288, 284, 297, 311.1, 311.5, 178, 183, 195, 298; 264/210.8, DIG. 75

[56] References Cited

U.S. PATENT DOCUMENTS

| | | | |
|---|---|---|---|
| 2,528,793 | 11/1950 | Secrist | 428/280 |
| 2,625,733 | 1/1953 | Secrist | 428/280 |
| 2,765,513 | 6/1956 | Walton | 26/18.6 |
| 2,765,514 | 6/1956 | Walton | 26/18.6 |
| 3,266,969 | 8/1966 | Makansi | 428/92 |
| 3,413,182 | 11/1968 | Simons | 156/62.4 |
| 3,423,266 | 1/1969 | Davies et al. | 264/210.8 |
| 3,565,729 | 2/1971 | Hartmann | 156/167 |
| 3,655,474 | 4/1972 | Constantine | 156/178 |
| 3,673,021 | 6/1972 | Joa | 156/62.4 |
| 3,676,239 | 7/1972 | Soehngen | 156/209 |
| 3,687,759 | 8/1972 | Werner et al. | 156/167 |
| 3,689,342 | 9/1972 | Vogt et al. | 156/167 |
| 3,691,004 | 9/1977 | Werner et al. | 428/246 |
| 3,802,980 | 4/1974 | Harmon | 156/181 |
| 3,837,338 | 9/1974 | Chesky et al. | 428/182 |
| 3,837,988 | 9/1974 | Hennen et al. | 156/167 |
| 3,914,501 | 10/1975 | Miller | 428/296 |
| 3,928,696 | 12/1975 | Wandel et al. | 405/19 |
| 3,949,130 | 4/1976 | Sabee et al. | 428/296 |
| 4,012,249 | 3/1977 | Stapp | 156/167 |
| 4,042,740 | 8/1977 | Krueger | 428/138 |

*Primary Examiner*—Stanley S. Silverman
*Attorney, Agent, or Firm*—John H. Shurtleff; Alan Stempel; Francis W. Young

[57] ABSTRACT

A low density matting structure of improved transverse strength obtained by vertically laying continuous melt-spun thermoplastic macrofilaments (diameter=0.1–1.5 mm) onto a horizontally moving profiled support in overlapping rows of irregularly looped filaments to form a peak and valley three-dimensional structure undulating in its longitudinal and/or transverse direction. The matting articles consist essentially of the melt-spun filaments which are self-bonded or fused at random points of intersection without using any bonding agent or reinforcing inserts, and the resulting matting is especially distinguished by a high transverse strength per unit of surface weight of at least 2 Nm/g and preferably 4 Nm/g.

10 Claims, 12 Drawing Figures

LONGITUDINAL

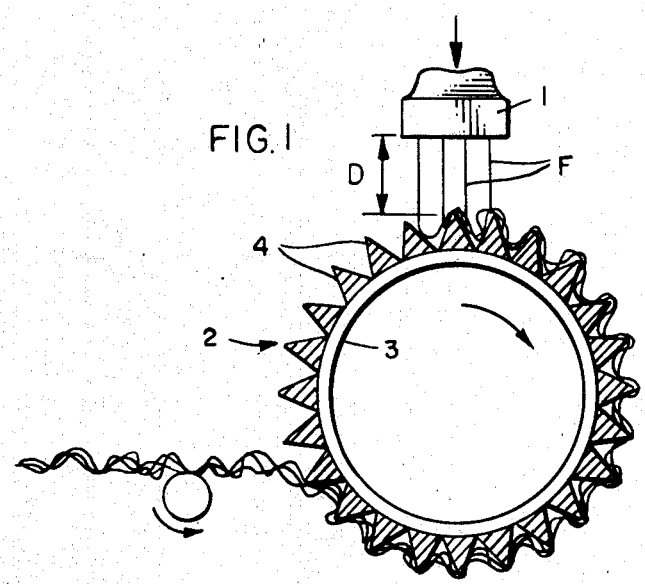
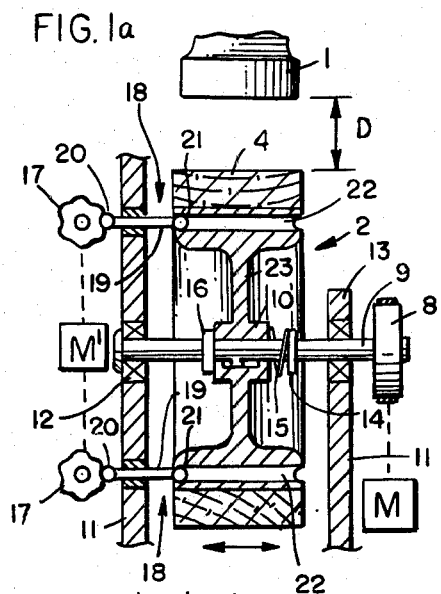
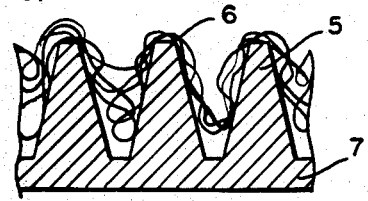
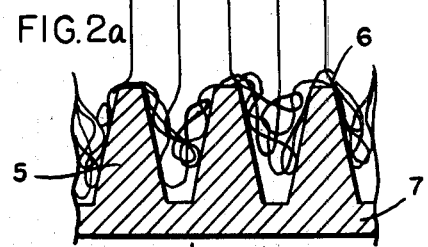
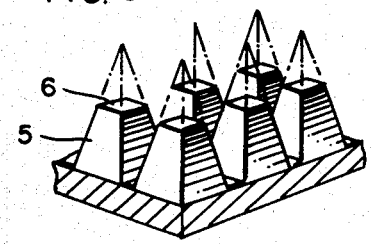
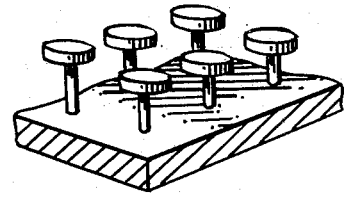
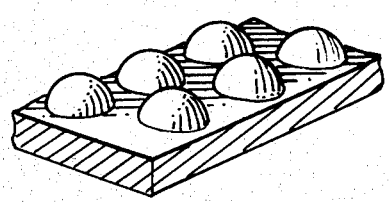
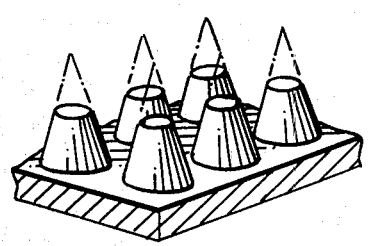

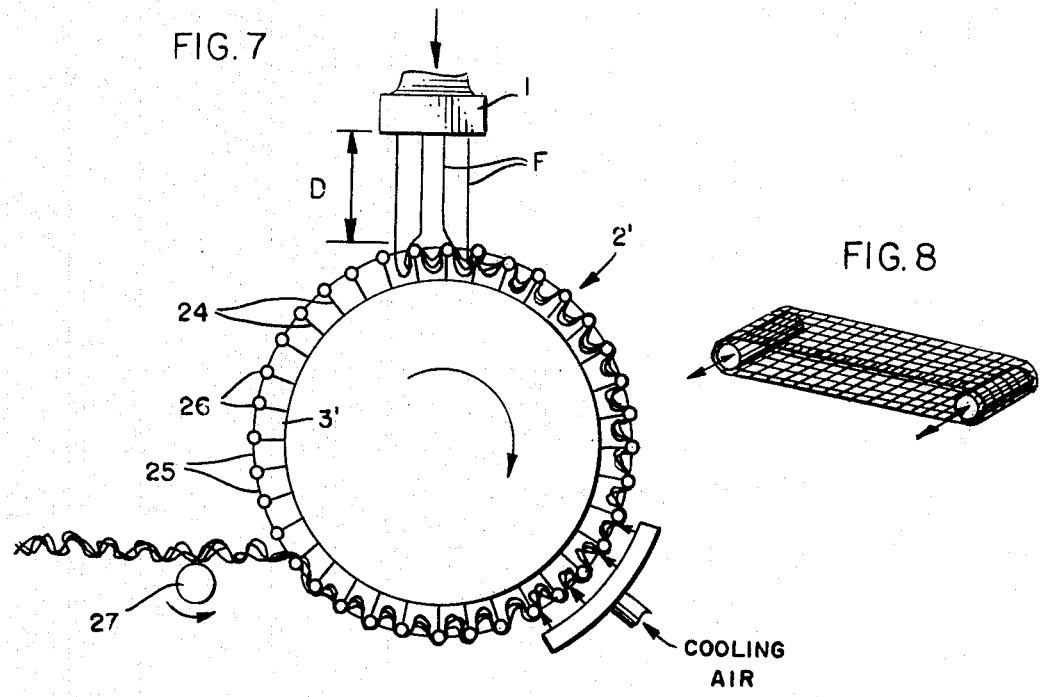
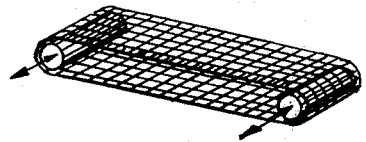
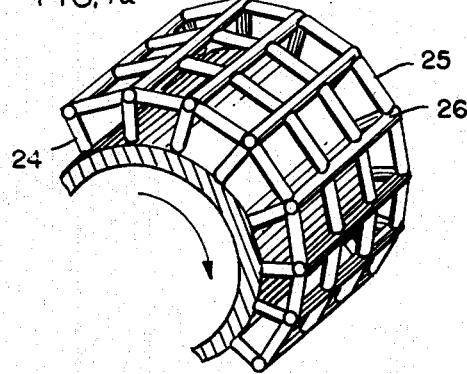
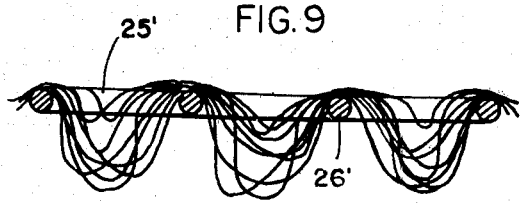
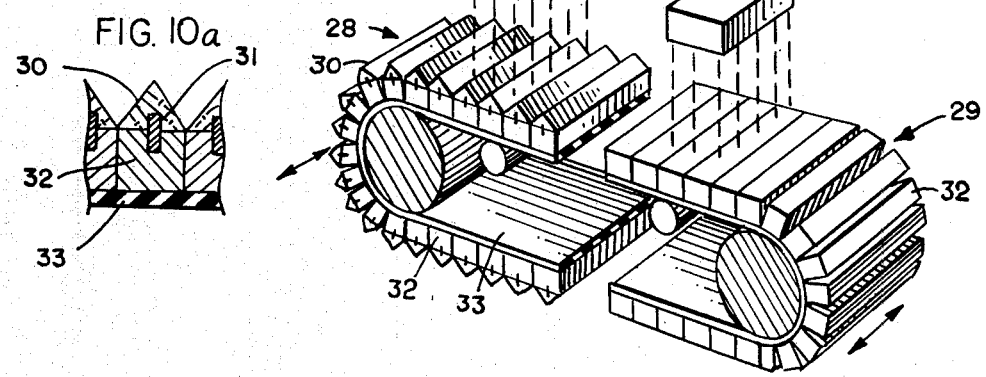

LOW DENSITY MATTING AND PROCESS

This is a division of application Ser. No. 703,277 filed July 7, 1976 now U.S. Pat. No. 4,252,590.

Self-bonded matting articles are known, for example, from German laid-open application, DT-OS No. 1,810,921, which corresponds to U.S. Pat. No. 3,691,004. These known mattings are formed by extruding a polymer melt as threads or filaments with a diameter of 0.1 to 1.5 mm. from nozzle openings or spinning orifices that are equidistant from one another in at least three rows and staggered with respect to one another from row to row. The spun or extruded filaments in the form of a thread bundle with parallel rows of filaments are deposited directly onto a cooling liquid, preferably water, the spacing between base of the spinning orifices and the bath surface being about 2 to 30 cm., preferably 4 to 20 cm. The individual filaments in this known process are deposited in the form of regular sinuous to helical loops which then sink into the bath and bond together at their overlapping points of intersection, i.e. where the loops spread laterally and adhere by reason of their own tackiness in the transition from the molten into the solid state. The matting is thereby formed into layered rows of looped filaments, each row of overlapping self-adhering looped filaments being positioned on top of and in adherent contact with the next underlying row, and the bottom row preferably being supported on a flat guide plate which extends at an angle of between about 10° to 80° to the surface of the bath such that one can orient the positions of the loops in each layer of the rows of looped filaments. For example, the loops in the bottom layer in direct contact with the flat guide plate can be laid parallel to the plate with the remaining looped rows superimposed thereover, each layered row having its loops set at an angle to the plate or bottom layer in the bath. This angle tends to remain constant in each layered row but becomes greater as each layer is laid upon a lower layer, thereby decreasing the density of the matting from bottom to top.

After the filaments have been solidified in a substantially amorphous state to form a coherent self-bonded matting, the finished article is drawn out of the water bath, shaken, dried and wound or otherwise collected. This matting article has a high compressive strength as well as good longitudinal strength. However, its transverse strength is relatively low when pulled or flexed from side to side.

In order to provide for the formation of one or two smooth and compressed surfaces of the matting, it is also possible to arrange one or two rotating rollers in the water bath in such a way that a part of the spun filaments in the bath strike the roller surface secantially to tangentially. In this case, the layered structure of the looped filaments can be maintained even though the bottom and/or top surfaces are compressed or densified in the bath.

According to another known process (DT-OS No. 1,922,460, and U.S. Pat. Nos. 3,686,049 and 3,837,988), mattings are produced by extruding a polymer melt from spinning openings arranged in several rows in such a way that the still tacky threads fall completely or at least partly onto the surface of a roller immersed about half way into a bath situated about 20 to 25 cm. under the spinning nozzle. The remaining row or rows of filaments fall directly into the water bath and intermingle and interengage one another as irregular loops in a non-layered structure. The filaments are only "removably welded" at points of mutual contact, and the matting requires the addition of an "integrating means", e.g. a bonding resin or other typical bonding agent which must be separately applied from another bath or by spraying. The roller used in this known process may be smooth but can be provided with pins, pegs or spikes which assure the continuous transport of the matting through the water bath. Such pins or pegs can also be used to modify the structure of the web being formed. A substrate such as a plastic screen, film, scrim or the like can be introduced onto the roller for direct application of the matting so as to form a laminate. The matting produced by this process is always flattened and reinforced on one side.

Mattings as produced by these known processes are widely useful, for example, as a reinforcement of plastic articles or as a laminated and/or additionally bonded webs or mats. It is especially desirable to provide self-bonded mattings, i.e. free of bonding agents or reinforcing laminates or the like, for example for use as cushioning materials, filter mats, vertical and horizontal drainage structures, or reinforcing and supporting mats for transportable turfs and roll-out paths or the like. Other uses of self-bonded mattings include: retaining mats for growing plants, fish, clams or the like; protective mats for lawn surfaces subject to severe wear and tear; soil retention mats to protect against erosion, including mats for ground slopes, dams, embankments or the like; sink-mats or the like used in hydraulic engineering for retention of sediment; covering or bedding material for animal enclosures and especially cow stalls; and supports or reinforcements in floors, walls or/ceilings of building structures. Self-bonded and additionally bonded mattings may also be used for carpet replacement and for many other purposes.

In many of these known utilities, the mattings or webs are subjected predominantly to external pressure so that compressibility becomes a decisive property. For use as a soil retention matting, for example in the protection of slopes and in the securing of dikes or embankments where the mattings are laid on sloped surfaces and are then filled with soil, sand, rocks or the like which may also contain fertilizer, pesticides, seeds or the like, the tensile strength of the matting becomes of primary importance.

The strength of self-bonded mattings, as determined in the longitudinal direction, is essentially determined by the strength of the filaments themselves. However, the strength in the transverse direction is essentially determined by the strength of the bonding, adhesion or fusion of the individual filaments at their points of intersection. In many if not most cases, the serviceability and practical utility of such mattings is critically dependent upon this so-called "transverse strength", i.e. the tensile strength of the matting sheet or web measured transversely to its running direction, which in all of the prior self-bonded mattings as obtained by known processes is substantially lower than the tensile strength measured in the longitudinal direction of the matting.

The "transverse strength" of the matting is determined in the following manner. With the aid of a band saw, a sample strip is cut from a matting, transversely to its draw-off or longitudinal running direction, the strip being at least 5 cm. in width and with its ends cut off if necessary such that the sample strip is at least 25 cm. long. This sample strip is clamped in a tensile testing machine at each narrow end in conventional manner, and the strip is then pulled apart from either end at a rate of 100 mm/min. The tensile strength and elongation are recorded on the chart of a recording apparatus. As long as the matting strip only stretches without breaking open any of the points of adhesion or bonding between the filaments, the stress-strain curve rises steadily. After the first break or detachment of a bonding point, a severe drop of stress or tensile strength is observed. The maximum stress or tensile strength is noted just before this drop on the recording chart. This value N of the transverse strength (measured in newtons) is taken with reference to the width of the strip (measured in meters) so that the transverse strength is measured as newtons/meter (N/m).

The mattings produced by the process of German Application DT-OS No. 1,810,921 (U.S. Pat. No. 3,691,004) have a transverse strength of 200 to 250 N/m, with a surface area weight of 300 g/m$^2$, and a transverse strength of 380 N/m with a surface area weight of 500 g/m$^2$. The specific transverse strength of these known mattings per unit of surface area weight always lies below 1 Nm/g.* By special temperature control of the filaments from the nozzle or spinning orifices to the cooling bath, it is possible to achieve a slight increase of the transverse strength per unit of surface area weight up to about 1.23 Nm/g. In this range of surface area weight, the mattings reach a maximum transverse strength of about 620 N/m when obtained in the known processes as self-bonded products consisting only of the spun filaments and without extra bonding agents.

*Surface Area Weight=weight of matting per unit of surface area; Specific Transverse Strength=Transverse strength per unit of surface area weight.

A further increase of this transverse strength can be achieved in those prior mattings which have been integrated by adding bonding agents, e.g. by impregnating the matting with a latex binder or the like. The matting after being drawn out of the cooling bath, shaken and dried, is sprayed in this case with a binder or immersed in a bath containing the binder, followed by a thermal after-treatment to dry or harden the binder. Such an addition of a binder followed by thermal after-treatment is extremely expensive. Nevertheless, even by means of such binders, one can achieve an increase of transverse strength only up to about 600 N/m in a matting with a surface area weight of 300 g/m$^2$ and less than 900 N/m in a matting which weighs 500 g/m$^2$. The increased transverse strength in these two instances is obtained at the expense of an increase of the surface area weight of 110 and 60 g/m$^2$, respectively, as contributed by the applied binder.

It has also been proposed in copending U.S. Application Ser. No. 593,054, filed July 3, 1975, by Hans Stapp (German patent application No. P 24 31 871.6) to increase and equalize the longitudinal and transverse strengths of a matting composed of substantially amorphous filaments by interposing and fully incorporating into the self-bonded filaments a flat lattice or mesh-like structure composed of high-strength synthetic threads, wires, glass filaments or the like having a strong, mesh-like or screen-like reinforcing surface structure. This process, while technically feasible, is relatively complicated and very expensive. This is likewise true of the process disclosed in German laid-open Application DT-OS No. 2,225,043, in which the matting process of DT-OS No. 1,810,921 is modified to the extent that the filaments from several spinning heads arranged in sequence are spun into a multilayer matting, a reinforcement being introduced between the first and second spinning head, i.e. between the two lowest layers of the filamentary matting.

One object of the invention is to provide a matting article of low density which consists essentially of self-bonded synthetic polymer filaments and which has a transverse strength considerably higher than that exhibited by previously known mattings of this type, i.e. without using additional impregnants or bonding agents and/or reinforcement of the self-bonded matting by means of strong supplemental inserts, e.g. screens, fabrics or the like. In particular, the transverse strength of the matting is to be increased with respect to its specific surface area weight far beyond that now available in similar types of webs or mattings. It is also an object of the invention to provide a low density matting with excellent compressibility, bending (fatigue) strength and/or elasticity whenever such properties are required.

Yet another object of the invention is to provide a technically simple and economical process for manufacturing such low density mattings having a complete range of required surface area weights and thicknesses while always exhibiting a substantially increased transverse strength per unit surface weight. In particular, the invention provides a process in which further impregnation and/or reinforcement of the matting is superfluous, thereby permitting the matting to be formed of self-bonded filaments alone while still increasing the strength properties, especially the transfer strength to more nearly equal the longitudinal strength and to provide a more nearly anisotropic structure in terms of its self-cohesion and resistance to tearing or bursting.

The process of the invention also avoids spinning into a cooling water bath or other liquid acting as a cooling or quenching bath, so that the self-bonding or adhesion of the filaments to each other is substantially improved through a more gradual cooling in air at room temperature or by forced circulation of air over the initially formed matting. Thus, a strong welding, adhesion or fusion at the bonding points is achieved in the absence of liquid coolants as well as in the absence of additional bonding or reinforcing agents. The process of the invention also improves the transverse strength per unit surface weight of the matting by special techniques of imparting a longitudinal and/or transverse undulating peak and valley structure to the matting.

In accordance with the invention, it has now been found that these and other objects and advantages are achieved by the preparation of an improved matting article which is essentially characterized by its transverse strength per unit of surface weight of at least 2 Nm/g and preferably at least 4 Nm/g or even more, the matting otherwise consisting essentially of a plurality of continuous melt-spun synthetic polymer filaments of a diameter of about 0.1 to 1.5 mm laid in overlapping rows of irregularly looped and intermingled filaments to form, in the aggregate a peak and valley three-dimensional surface structure undulating in the longitudinal and/or transverse directions of the matting, the individual filaments in said matting being self-bonded at random points of intersection and having a number of transversely directed loops sufficient to provide said transverse strength.

The individual filaments are preferably melt-spun with a diameter of at least 0.2 mm and especially up to about 1 mm, and although any synthetic thermoplastic polymer may be used in principle, especially good results have been achieved with conventional fiber-forming polymers such as nylon, very high values of strength being achieved for example with polycaprolactam filaments.

The preferred matting articles are those in which its three-dimensional structure undulates in both longitudinal and transverse direction, e.g. so as to provide a waffle-like appearance to the finished article even though it is completely free of bonding agents, impregnants, reinforcing inserts or the like and also without any compression or flattening of the matting to achieve this appearance. In most cases the undulations are created by peaks and valleys running longitudinally and transversely of the elongated strip or web of the matting. However, these peaks and valleys may also run diagonally of the matting to fall within the scope of undulations defined as running "longitudinally and/or transversely" of the matting.

The low density, transversely strengthened, three-dimensional, undulating matting having the peak and valley structure of the invention can be produced by a process which comprises the following steps: melt-spinning a plurality of the synthetic polymer filaments with a diameter of about 0.1 to 1.5 mm. from a series of closely spaced spinning orifices arranged in rows on the bottom face of a spinning nozzle such that the filaments fall substantially vertically downwardly for deposit onto a moving support which intersects the filaments substantially horizontally at a distance of about 3 to 20 cm, preferably 3 to 16 cm, below said nozzle face and which provides a patterned reentrant supporting surface with uppermost salient portions onto which the filaments are first directed and supported in their vertical fall so as to form the peaks of said matting structure and with downwardly opening reentrant areas between said salient portions into which filamentary loops are directed both longitudinally and transversely so as to form the valleys of said matting structure, the filaments from adjacent spinning orifices overlapping and self-bonding with each other at random points of intersection; cooling and solidifying the freshly deposited and self-bonded filaments while the matting is continuously transported away from the spinning nozzle on said moving support; and finally removing the cooled and solidified matting from the moving support.

Although the moving support can be provided by a number of different embodiments, it is especially advantageous in achieving the best results of the invention to employ a cylinder, roller, drum, continuous belt or similar conveyor system which has a patterned reentrant supporting surface formed by a large number, preferably about 16 to 150, individual projections per square decimeter (100 cm$^2$) arranged on a base of the moving support in a regular repeating pattern, e.g., in regular rows or files including a diagonal or staggered pattern, thereby providing uppermost salient portions capable of forming the peaks of the matting structure and reentrant areas therebetween where the valleys are formed. The use of truncated pyramids or semispheres is especially useful in achieving good filament coverage over each peak of the undulating matting structure.

When using such individual projections in relatively large numbers so that a substantial portion of filaments are spun directly downwardly onto these peaks, there is a natural tendency for the filaments to form loops after striking a projection, said loops being diverted from one side to the other in a statistically random pattern. The resulting transverse looping and overlapping of adjacent filaments from side to side of the individual projections can thus occur naturally as the moving support follows an exclusively longitudinal transporting path away from the spinning nozzle. However, it is an especially desirable feature of the process according to the invention to reciprocate the moving support transversely with respect to the longitudinal direction of transport under the vertically deposited filaments.

In general, the stroke distance or reciprocating movement of the supporting surface should be slightly greater than the transverse distance between adjacent filaments, and for the most useful matting structures, this stroke will be about 3 to 10 mm. The frequency of traversing movement, i.e, back and forth over this distance, depends in part on the transport speed of the matting on the longitudinally moving support. However, with a generally preferred transport speed of about 2 to 10 m/min, the reciprocating movement can fall in an approximate range of about 80 to 300 times per minute. It is also especially preferred to locate the moving support at a distance of about 3 to 9 cm. below the spinning nozzle face when using this reciprocating movement.

It will be understood that an equivalent traversing movement of the spinning nozzle over the longitudinally moving support is feasible but less desirable, especially with a large number of closely parallel filaments being melt spun.

The invention is further explained in greater detail and fully illustrated in connection with the accompanying drawings in which:

FIG. 1 is a schematic and partial cross-sectional view of a profiled drum as a moving support located vertically below a spinning nozzle to receive the freely falling melt-spun filaments and to form the matting structure of the invention;

FIG. 1a is a schematic cross-sectional view taken vertically through the axis of the profiled drum in FIG. 1 with additional elements added to illustrate both the longitudinal and reciprocating movements of the drum as it moves in an approximately horizontal plane under the spinning nozzle;

FIG. 2 is an enlarged cross-sectional view, taken in the longitudinal direction, of a small section of truncated four-sided pyramids used as preferred projections on a moving support;

FIG. 2a is a similar enlarged cross-sectional view, taken in the transverse direction, of the same small section of pyramids first shown in FIG. 2;

FIG. 3 is a perspective view of the same pyramids shown in FIGS. 2 and 2a;

FIG. 4 is a perspective view of a small section of plate or disc supporting surfaces mounted in a projecting position by means of upright stems or pins on the moving support;

FIG. 5 is a perspective view of a small section of semispheres as projections or protrusions mounted in staggered position from row to row on the moving support;

FIG. 6 is a perspective view of a small section of truncated conical pyramids mounted in a regular pattern on the moving support;

FIG. 7 is a schematic and partial cross-sectional view of another type of profiled drum carrying a grid or lattice-work of rods in a projecting square pattern supported by upright rods mounted on the circumference of a rotatable cylinder or base of the drum;

FIG. 7a is a partial perspective view of the drum shown in FIG. 7 to better illustrate the relatively large diameter of the rods which form the projecting mesh or grid as a supporting surface to receive the freshly melt-spun filaments;

FIG. 8 is a perspective view of an alternative horizontal screen supporting surface operated as a continuous belt around two rollers which may be reciprocated to provide a transverse movement as well as a longitudinal transporting movement to the matting supported thereon;

FIG. 9 is an enlarged sectional view through a small section of a grid, lattice-work, screen or the like, especially the grid of FIGS. 7 and 7a, to schematically illustrate the overlapping position of filament loops which are directed into the grid openings;

FIG. 10 is a schematic perspective illustration of still another embodiment of a continuous belt support with triangular prism projections mounted thereon under one spinning nozzle but omitted from a second belt portion extending horizontally under a second spinning nozzle;

FIG. 10a is an enlarged cross-sectional view of one segment of the continuous belt support shown in FIG. 10;

Figure 12:
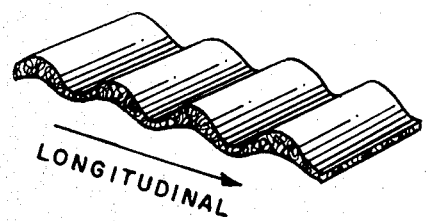
Figure 12A:
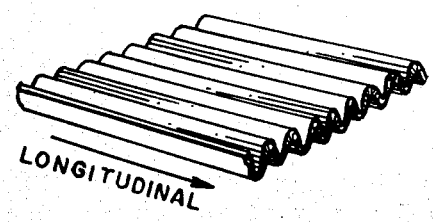

FIG. 12 is a perspective view of a longitudinal segment of another embodiment of the matting with undulations extending transversely of the matting and its moving support, e.g. as when formed on the prism projections indicated by FIGS. 1, 10 or 10a; and FIG. 12a is a perspective view of a longitudinal segment of still another embodiment of the matting with undulations extending longitudinally of the matting.

It will be understood that all of the moving supports, whether as drums, rollers, screens, belts or other transporting means, are moved longitudinally in a conventional manner by a motor-operated and speed-regulated drive means, it being important to maintain an approximately horizontal moving support directly below the spinning nozzle. Thus, the curvature of any drum or roller ought to be minimal in comparison to the total area directly below the spinning nozzle onto which the filaments are spun. Referring now to FIGS. 1 and 1a, the undulating three-dimensional matting structure is constructed in a very convenient manner by melt-spinning four rows of filaments F vertically downwardly from the spinning nozzle 1 having spinning orifices of a diameter of preferably more than about 0.2 mm. An endless moving support, in this instance the profiled cylindrical drum 2 including a base rim 3 bearing the profiled projections 4, is rotated on its axis with the apex or uppermost point of each projection being located directly beneath the spinning nozzle at the distance D of about 3 to 20 cm, preferably 3 to 16 cm, it being essential to avoid an excessively long free vertical drop of the filaments between the lower face of the spinning nozzle and the uppermost projecting point or salient portion of the profiles 4. The specified limits for the distance D have a critical significance because it is not necessary to heat the free fall interval when working according to the present invention. At a distance D slightly more than 20 cm, a satisfactory transverse strength is still achieved with the application of heat in known manner (U.S. Pat. No. 3,686,049). However, at distances D appreciably greater than 20 cm, it is not possible to achieve the results of the present invention even with such application of heat to the falling filaments.

When using a large drum 3, the profiles 4 offer upper points falling in a slightly curved plane so that D fluctuates by a small increment over the four rows of filaments F. For practical purposes however, this slightly curved plane provides an approximate horizontal intersection with the vertically falling filaments. The filaments fall on top of each profiled projection 4 and then extend in a random manner into the reentrant or valley portions between the projections in the form of overlapping and intermingled loops, at least some of these loops being directed transversely of the drum as well as longitudinally during the rotation of the drum.

When using rows of individual projections as indicated by FIGS. 2-6, inclusive, some of the filaments will drop directly onto an upper surface of each projection with loops being formed due to a falling velocity of the filaments which is greater than the peripheral speed of the drum. These loops are directed not only into the transverse valleys between the truncated pyramids 5 as shown in FIG. 2 after passing over the flat top surfaces 6, but also tend to run off to either side down into the longitudinal valleys as indicated in FIG. 2a. Moreover, filaments directed vertically into the valleys may strike the inclined sides of the truncated pyramids 5, but even if normally directed to the base portion 7 at the lowest point of the valley, the filaments will contact adjacent looping and overlapping filaments in the same row and also from row to row so as to also form loops extending in random directions.

The use of individual projections in files extending longitudinally of the circumferential drum surface has a highly beneficial effect in itself of promoting lateral or transverse looping and overlapping of filaments on either side of the projections, thereby substantially increasing the number of points of mutual intersection of loops from adjacent filament rows. Also, the fusing or welding of the still hot and relatively fluid filaments ensures a very strong bonding point in each instance. This kind of bonding in turn greatly increases the transverse strength of the finished matting.

The transverse strength achieved by the random lateral or transverse overlapping of filament loops and the fusing together at random points of intersection is still further increased, of course, by providing a larger number of spinning openings and/or by increasing the ratio of spinning velocity to the velocity of the moving support (transport velocity). Both of these measures, however, cause an undesired increase of the area weight and the density of the finished matting.

It has been found that with operating conditions otherwise remaining the same, i.e. so as to retain a constant area surface weight, the number of bonding or fusion points and thereby the transverse strength can be remarkably increased if the moving support is reciprocated transversely to its direction of longitudinal transporting movement. Preferably the traversing or reciprocating movement has an amplitude or stroke distance of about 3 to 10 mm and a frequency of about 80 to 300 strokes per minute. Each stroke is measured by a complete cycle back and forth, i.e. traversing the stroke distance twice in each cycle.

Such traversing or reciprocating movement when added to the normal transport speed of about 2 to 10 m/min results in a further increase in the transverse strengths per unit of surface weight by a factor of about 2 to 3. For example, in using nylon filaments, the minimum transverse strengths per unit of surface weight can be increased up to values of at least 7 Nm/g and preferably at least 10 Nm/g. Polycaprolactam filaments have been used exclusively in such mattings so as to achieve these values of the transverse strength and therefore result in especially preferred and exceptionally useful matting article.

Suitable apparatus for carrying out the traversing or reciprocating movement of the supported matting is shown in partly schematic form in FIG. 1a which is taken through the axis of rotation of the drum 2 located vertically below the spinning nozzle 1. The drum 2 is driven by motor M over pulley 8 which rotates the drive shaft 9 keyed to the sliding hub 10 mounted for reciprocal movement axially of shaft 9. This drive shaft is conveniently mounted in a frame 11 in the bearing supports 12 and 13. A flange 14 carries the coil spring 15 which resiliently urges the drum hub 10 to the left where a stop flange 16 can be adjustably fastened to the shaft to regulate the stroke distance or amplitude of the drum reciprocation.

The frequency of reciprocation can be preset or regulated in any number of ways using conventional camming or piston/cylinder devices to move the relatively light weight drum and the matting being formed. As shown in FIG. 1a, for example, two cams 17 can be synchronously rotated by motor M' at variably adjusted speeds for back and forth movement of their respective cam followers 18 which can be mounted as a bar or rod 19 in suitable bearing sleeves with small wheels or rollers at each end to reduce friction as much as possible. One wheel 20 runs on the cam 17 while the opposite wheel 21 can ride in a concave ring around the base rim 22 of the drum which also carries the triangular prisms 4 mounted thereon. The rim 22 is connected to the hub 10 by means of the spokes 23 in a sturdy but light construction.

In place of cam operated means to reciprocate the drum in a transverse direction, i.e., on its axis of rotation, one can also attach a piston rod (not shown) to an axially slidable flange 16 and then move the piston rod by hydraulic or pneumatic force at the desired frequency. Other variations will be obvious to a skilled mechanic.

The moving support found to be most useful according to the invention is one with a large number of individual projections, protrusions, protuberances, or similar upright members, which are preferably uniformly distributed in rows and files in an aligned or staggered pattern and removably fastened to the underlying base support of a roller, drum, conveyor belt or the like. These projections can extend upwardly or outwardly from the base support for a height of from 2 to 100 mm, for example, depending on the intended purpose or utility of the matting. The preferred height of the projections is about 5 to 70 mm. The projections can be the truncated pyramids of FIG. 3, nails with more or less pronounced flat heads of FIG. 4, the semispheres of FIG. 5, or the truncated cones of FIG. 6. One may also use screws, bolts, or other arbitrarily formed elements which are easily fastened in the supporting base of the roller, drum, conveyor belts or the like, provided that there are upper salient portions first receiving the downwardly spun filaments.

The valley spacing between adjacent projections, e.g. pyramids, should be sufficiently great so that the filaments hang down in loops between the peaks insofar as possible to the surface of the roller, drum or belt support so that they can also form points of fusion or bonding even at the lowest regions of the valleys. It is especially advantageous for the number of projections per unit area of the support to be within a range of about 16 to 150 projections per square decimeter. With matting thicknesses of 10, 15 and 25 mm, an especially successful distribution of the projections has been found to be a number of about 120, 65 and 50 projections per square decimeter, respectively.

Referring again to FIG. 2, it is possible to easily produce this preferred set of projections by providing the roller, drum, conveyor belt or the like with an adherent layer or plate into which a network of V-shaped grooves are formed by cutting, milling or the like. In this way, one obtains the preferred projections consisting of four-sided truncated pyramids. The matting produced with such projections has a waffle-like undulating three-dimensional structure.

The height ratio of height to mean distance between these pyramids h:d as illustrated by FIG. 2 is usually within limits of about 6:1 to 1:3 and preferably 4:1 to 1:2. However, these proportions can be widely varied while still gaining at least some improvement in transverse strength per unit of surface weight.

A somewhat less desirable moving support is that illustrated by FIGS. 7, 7a and 9 in the form of a grid or lattice structure supported on a drum or a conveyor belt, the least desirable support being the screen band or belt shown in schematic form in FIG. 8. Such drum or belts are useful, however, as transporting means and in either case can be reciprocated in a transverse direction where required. When used as the moving support for the present invention, e.g., as mounted on the drum 2', by means of radial support members 24 fastened to the rim 3', the grid or lattice supporting surface can be formed by rods or tubing 25 and 26 composed of wood, rubber or other suitable material, including non-adherent plastic or ceramic elements, arranged on a drum 2' as shown in FIG. 7a, or as a screen belt as shown in FIG. 9 with the longitudinal rods 25' and transverse or cross rods 26'.

When using such screens or grids on a drum or endless band, it is desirable to provide sufficiently large reentrant openings and sufficiently narrow rods or grid members so that the filaments are deposited, ordinarily with a traversing or reciprocating movement of the grid support, to drape over the rods from side to side as well as in the longitudinal direction. In this manner, the filaments form sagging loops in a random overlapping fashion to again achieve an essentially three-dimensional peak and valley matting structure with both transverse and longitudinal undulations. Once this matting is solidifed without adhering to the screen or grid support, preferably with the aid of cooling air as indicated in FIG. 7, it is withdrawn over a guide roller 27 without passage through a cooling bath and without any addition of bonding agents, impregnants, or the like. The finished matting can be wound up or deposited in any suitable manner for storage.

Care must be taken in using a screen or grid to avoid its entrapment or attachment to the matting due to encirclement of individual rods or grid members by even a single filament. Depending upon the particular filaments being spun, these problems can be avoided by taking certain precautions, e.g. using rods or grid members of a diameter substantially greater than the individual filaments and maintaining a horizontal support for some extra distance after vertical deposit of the filaments.

It is important that the projections, regardless of their particular form or construction, offer an upper salient portion or surface—whether in a horizontal plane as in the case of truncated pyramids or cones or by the selection of a structural material with a rough surface onto which the impinging filaments are directed vertically with sufficient surface resistance so that a part of the filaments remains deposited on top of the projections, i.e. on or over the individual peaks.

The material forming the projections should not adhere to the hot spun filaments, at least after they have been cooled and solidifed just prior to removal from the moving support. Suitable materials for making the projections include especially wood and rubber, although highly polished metals may also be used and can be coated if necessary with lubricants or anti-stick agents. Ceramic or other special materials can also be used e.g. polytetrafluoroethylene (Teflon) coated members or the like. Wood or rubber projections are especially easy to fabricate and attach to a base support and can be easily cleaned or replaced as individual projections or segments of a profiled surface. This ensures a three-dimensional matting structure with an especially high void or hollow space and correspondingly low density.

While known mattings produced from synthetic polymer macrofilaments of about 0.1 to 1.5 mm in diameter have a hollow space or proportion of voids reaching a maximum of about 91 to 92%, mattings produced according to this invention achieve a hollow space of more than 95%, i.e. with reference to the total volume of the matting. Correspondingly, the mattings of this invention are distinguished from previous mattings of this type by a very low weight per unit volume, i.e. a density or measure of its solid content which can be expressed as the surface weight per unit thickness. This surface weight of the matting per unit of its thickness, as obtained by the process of the invention, is less than 50,000 g/m$^3$ and preferably less than 40,000 g/m$^3$, while in the known mattings, this value lies far above 70,000 g/m$^3$. When these weights per unit volume are multiplied by $10^{-6}$, one can obtain a density measurement in units of grams per cubic centimeter (g/cm$^3$). The extremely low density values according to the invention are thus calculated as less than 0.05 and preferably less than 0.04 g/cm$^3$.

The most significant difference of the matting of the invention from the known mattings resides in its high transverse strength of at least 600 N/m, preferably of at least 1,000 N/m. When combined with the low surface weight and low density of the matting, this strength for a given weight or density represents a highly advantageous improvement.

Finally, the matting of the invention also exhibits a higher polymer density compared to mattings spun into a bath, this higher density being due to a partially crystalline molecular structure of the polymer. For example, in polycaprolactam mattings produced according to the invention, there were determined average densities of the polymer itself of about 1.14 g/cm$^3$, while filaments spun directly into a water bath are in an amorphous state and exhibit an average density of only about 1.12 g/cm$^3$. The formation of crystalline regions or so-called crystallites in the polymer is most evident in polymers having short repeating monomeric units and symmetrical structures, especially the usual fiber-forming thermoplastic polymers. Gradual cooling of the matting also helps to increase the formation of a more crystalline structure. Therefore, once the matting has been laid, it is preferably maintained at a temperature substantially below its melting point (Tm) but still above the second order transition temperature, sometimes referred to as the "glass transition temperature" (Tg). These temperatures are well known for conventional fiber-forming polymers such as polyesters, polyamides or the like. In particular, for the production of mattings that are to be stored or exposed to a wide range of environmental conditions, e.g. as soil retention mats or turf mats, UV-stabilizers can be added such as 0.2 to 1.0% by weight of carbon black, thereby preventing a loss transverse strength even after relatively long exposure to sunlight.

In general, the mattings of the invention can be made with surface weights of about 100 g/m$^2$ or more, especially good results being achieved in the range of 200 to 1000 g/m$^2$.

Higher surface weights or mattings of especially great thickness can be achieved with the apparatus suggested by FIGS. 10 and 10a, i.e. using a second spinning nozzle arranged at a distance from the first nozzle 1 so that the matting initially formed on the profiled belt support 28 is already substantially cooled, and spinning and depositing onto this preformed matting a second layer of self-bonding synthetic polymer filaments which are preferably laid in a random pattern by the traversing movement of the second endless belt 29 so as to fuse or weld firmly with one another at their points of intersection. Adhesion to the underlying layer of preformed matting is not as strong as the fused or welded filaments, but transverse strength remains very high.

The prism projections 30 of the first belt 28, as illustrated in FIGS. 10 and 10a, can be made of wood or other suitable material for non-adhering contact with the spun filaments. These prisms are easily attached by the pin connections 31 to the metal base plates 32 which in turn are cemented or otherwise firmly attached to the rubber belt 33 in a manner similar to tank treads. These prisms have been omitted from the second belt 29 in FIG. 10 since the preformed matting can be simply transported on any suitable conveyor belt for passage under the second spinning nozzle.

Figure 11:
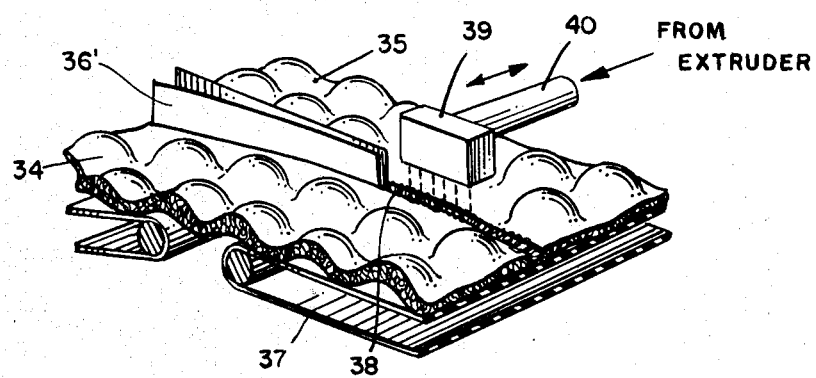
FIG. 11 is a schematic perspective view of apparatus used to seam together two preformed mattings, also illustrating a preferred longitudinal and transverse undulating structure of the mattings produced according to the invention.

Especially heavy or thick mats as well as wider mats can also be produced in a preferred manner as illustrated in FIG. 11 by bringing together two prefinished or preformed mattings of the invention in a side-by-side parallel relationship on a common moving support, being separated by a gap or spacing therebetween of several centimeters, e.g. anywhere from about 0.5 to 8 cm, and melt-spinning at least one self-binding macrofilament of a diameter of more than 0.2 mm into the gap and both transversely and longitudinally of the gap to overlap and form a seam between opposing parallel sides or edges of the two mattings, whereby the two mattings are joined securely with one another. The two preformed mattings 34 and 35 of FIG. 11 are typical of those produced on a truncated prism type of projection so as to undulate in both transverse and longitudinal directions. A guide rail 36 can be used to guide each matting from its own single width conveyor belt onto a common double width conveyor 37 to bring the two mattings together with the gap space 38 running directly under a reciprocating spinning nozzle 39 flexibly coupled to an extruder by line 40 to supply the molten polymer used to form the self-bonding seam holding the mattings together. The additional weight of this narrow seam is minimal so as to retain a high transverse strength per unit surface weight of the combined matting structure.

FIG. 12 indicates transversely corrugated or undulated matting with good flexibility for winding, e.g. as produced on the triangular prisms of FIGS. 1, 1a, 10 and 10a. Longitudinal corrugations or undulations are also feasible as illustrated in FIG. 12a if the matting is formed on a correspondingly ribbed drum or a set of wood prisms mounted on each base plate as in FIG. 10a, but turned by 90°, and aligned from plate to plate.

The mattings of the invention, through a suitable selection of the profiled support or projections and a desirably low surface weight, can have the most diverse handle or surface texture. For example, the mattings may be flexible with a soft handle or else boardlike with a very hard surface. For most purposes, especially to permit rolling the mattings for storage, a moderately flexible matting is preferred.

The matting of the invention independently of other operating conditions, e.g. the spinning speed, the desired surface weight, the type of polymer, etc., can generally be produced with a draw-off or transport speed of about 2 to 10 m/min. The matting is removed from the continuously moving support when it has cooled off sufficiently to avoid any serious deformation of the desired matting structure. As a rule, it does not need to be actively cooled, because the heat is generally dissipated sufficiently rapidly to the surrounding air and in some instances to the profile or projection. If desired, however, an active cooling can be carried for example by blowing with air or by the use of an internally cooled drum or similar heat transfer means.

It is possible to further modify the matting of the invention in a wide variety of known adaptations. Thus, the matting can be spun for example onto a grid or screen reinforcement such as a wire fabric having the same distribution of peaks and valleys as the profile or projections of the moving support. One can also line the matting with foils, fleece webs or the like, on one or both sides, depending upon the intended utility.

The improved transverse strength of the matting according to the present invention is believed to result from several factors. First of all the self-bonding or fusion of the still hot and relatively fluid filaments as they are laid in loops on the moving support create a much stronger bond than when the filaments are first quenched. A slower cooling and the appearance of crystalline regions also contributes to an increased strength. Moreover, by directing more loops in a transverse direction as the filaments are laid over the profiles or projections and into the valleys therebetween, there arises a larger number of bonding points transversely of the matting. The resulting peak and valley structure of the finished matting increases the total voids or hollow spaces even as the transverse strength is increased.

The invention is further explained by but not limited to the following examples.

EXAMPLES 1 TO 3

Using a conventional spinning head as indicated in FIG. 1 wherein the spinning nozzle contains 188 spinning openings (diameter=0.35 mm), molten polyethylene terephthalate was spun onto a roller arranged with its uppermost surfaces at an interval of 9 or 16 cm below the bottom of the spinning nozzle. The projections on the roller consisted of a series of truncated four-sided pyramids as indicated in FIGS. 2 and 2a, arranged uniformly to provide 126 such projecting pyramids per square decimeter of roller surface. As the roller rotated to receive the vertically spun filaments and to advance the matting being formed, it was also reciprocated back and forth on its axis over a distance of 6 mm and at a frequency of 150 times per minute. The resulting sheet or band of the matting was 10 mm thick and 270 mm wide with the properties shown in Table 1 which also gives the roller speed and the distance of the roller from the spinning nozzle.

TABLE I

| Example No. | | 1 | 2 | 3 |
| --- | --- | --- | --- | --- |
| A. | Surface speed of the roller (m/min): | 4.0 | 2.7 | 4.0 |
| B. | Distance of the roller from the spinning nozzle (cm): | 9 | 9 | 16 |
| C. | Matting surface weight (g/m$^2$): | 500 | 750 | 500 |
| D. | Transverse strength (N/m): | 1,480 | 3,990 | 1,750 |
| E. | Transverse strength per unit surface weight (Nm/g): | 2.96 | 5.32 | 3.5 |
| F. | Surface weight per unit thickness (g/m$^3$): | 50,000 | 75,000 | 50,000 |
| G. | Density of matting (g/cm$^3$): | 0.05 | 0.075 | 0.05 |

EXAMPLES 4 TO 6

Using the conventional spinning head of the first three examples having a spinning nozzle with 114 spinning openings (diameter=0.40 or 0.25 mm), polypropylene was spun down onto the same roller spaced 10 cm below the nozzle openings, the roller being rotated and also reciprocated axially over a 6 mm distance at a frequency of 150 times per minute. The same four-side truncated pyramids were again employed to provide projections on the roller. The operating conditions and properties of the matting after withdrawal from the roller are shown in the following Table II.

TABLE II

| Example No. | | 4 | 5 | 6 |
| --- | --- | --- | --- | --- |
| A. | Nozzle opening diameter (mm): | 0.40 | 0.40 | 0.25 |
| B. | Feed of polypropylene melt (g/min): | 342 | 342 | 604 |
| C. | Surface speed of the matting (m/min): | 3.3 | 3.0 | 2.1 |
| D. | Number of projections/dm$^2$: | 126 | 66 | 66 |
| E. | Matting Surface weight (g/m$^2$): | 305 | 325 | 533 |
| F. | Transverse strength (N/m): | 1,163 | 1,244 | 1,460 |
| G. | Transverse strength per unit surface weight (Nm/g): | 3.81 | 3.83 | 2.84 |
| H. | Matting thickness (mm): | 10 | 14.5 | 14.6 |
| I. | Surface weight per unit thickness (g/m$^3$): | 30,500 | 20,200 | 36,500 |
| J. | Density of | | | |

TABLE II-continued

| Example No. | 4 | 5 | 6 |
|---|---|---|---|
| matting (g/m³): | 0.0305 | 0.0202 | 0.0365 |

EXAMPLES 7 TO 10

Using different spinning nozzles, polycaprolactam filaments were spun onto the same profiled roller used in the preceding examples, spaced 9 cm. below the spinning nozzle, rotated at a peripheral surface speed of 4 m/min and reciprocated axially over a distance of 6 mm at a rate of 150 times per minute. The operating conditions and properties of the matting product are given in Table III.

TABLE III

| Example No. | | 7 | 8 | 9 | 10 |
|---|---|---|---|---|---|
| A. | Number of spinning openings: | 164 | 164 | 270 | 229 |
| B. | Spinning opening diameter (mm): | 0.25 | 0.25 | 0.25 | 0.25 |
| C. | Feed of polymer melt (g/min): | 261 | 415 | 415 | 415 |
| D. | Matting surface weight (g/m²): | 220 | 340 | 340 | 340 |
| E. | Transverse strength (N/m): | 840 | 1,430 | 1,850 | 2,030 |
| F. | Transverse strength per unit surface weight (Nm/g): | 3.82 | 4.21 | 5.44 | 5.99 |
| G. | Matting thickness (mm): | 10 | 10 | 10 | 10 |
| H. | Surface weight per unit thickness (g/m³): | 22,000 | 34,000 | 34,000 | 34,000 |
| I. | Density of matting (g/cm³): | 0.022 | 0.034 | 0.034 | 0.034 |

EXAMPLES 11 TO 13

Using a spinning nozzle with 270 spinning openings (diameter=0.25 mm), polycaprolactam filaments were spun to fall freely over a vertical distance of 12 cm directly onto the profiled roller (as described above using four-sided pyramids which are truncated), the roller being rotated at a peripheral surface speed of 4 m/min. There was no axial reciprocation or traversing movement of the roller in this instance. The operating conditions and final results exhibited by the matting are shown in Table IV.

TABLE IV

| Example No. | | 11 | 12 | 13 |
|---|---|---|---|---|
| A. | Number of projections/dm²: | 126 | 66 | 66 |
| B. | Matting surface weight (g/m²): | 300 | 400 | 500 |
| C. | Transverse strength (N/m): | 850 | 2,010 | 3,070 |
| D. | Transverse strength per unit surface weight (Nm/g): | 2.83 | 5.03 | 6.15 |
| E. | Matting thickness (mm): | 10 | 15 | 15 |
| F. | Surface weight per unit thickness (g/m³): | 30,000 | 26,700 | 33,400 |
| G. | Density of matting (g/cm³): | 0.0300 | 0.0267 | 0.0334 |

EXAMPLES 14 TO 16

Examples 11 to 13 were repeated except that the profiled roller in this instance was reciprocated or traversed axially over a distance of 6 mm at a rate of 150 times per minute. The properties of the matting are shown in Table V.

TABLE V

| Example No. | 14 | 15 | 16 |
|---|---|---|---|
| Matting surface weight (g/m²): | 300 | 400 | 500 |
| Transverse strength (N/m): | 2,480 | 5,130 | 6,170 |
| Transverse strength per unit surface weight (Nm/g): | 8.27 | 12.82 | 12.35 |

From this comparison, it will be readily seen that a reciprocation or traversing movement of the profiled roller in a direction axially of the roller, i.e. at right angles to the direction of travel of the matting on the roller, leads to an increase of the transverse strength by a factor of 2X to 3X.

One cannot measure the strength of each bonding point, and the transverse strength (N/m) of the matting by itself is not a distinguishing characteristic since it can be increased simply by adding more filaments in a given surface area or volume. However, the transverse strength per unit of surface weight of at least 2 and preferably 4 Nm/g or more is a significant value since it requires a comparison of transverse strengths for the same surface weight of different mattings. With the provision of lower density mattings of still greater transverse strengths, the finished products of the invention are less expensive while offering a much wider area of utility.

The invention is hereby claimed as follows:

1. A low density matting article consisting essentially of a plurality of continuous melt-spun synthetic polymer filaments of a diameter of about 0.1 to 0.5 mm. laid in overlapping rows of irregularly looped and intermingled filaments to form, in the aggregate, a peak and valley three-dimensional structure undulating in the longitudinal and/or transverse directions of the matting, the individual filaments in said matting being self-bonded at random points of intersection and having a number of transversely directed loops sufficient to provide a transverse strength per unit of surface weight of at least 2 Nm/g.

2. A matting article as claimed in claim 1 wherein the transverse strength per unit of surface weight is at least 4 Nm/g.

3. A matting article as claimed in claim 1 consisting essentially of nylon filaments and having a transverse strength per unit of surface weight of at least 7 Nm/g.

4. A matting article as claimed in claim 3 wherein the transverse strength per unit of surface weight is at least 10 Nm/g.

5. A matting article as claimed in claim 1 wherein the matting structure undulates in both longitudinal and transverse directions to provide a waffle-like appearance.

6. A matting article as claimed in claim 1 wherein the filaments have a diameter of about 0.2 to 1 mm. and the transverse strength per unit of surface weight is at least 4 Nm/g.

7. A matting article as claimed in claim 6 consisting essentially of polycaprolactam filaments.

8. A matting article as claimed in claim 1 in which the filaments are at least partly crystalline in their internal molecular structure.

9. A matting article as claimed in claim 1 having a density of less than 0.05 g/cm³.

10. A matting article as claimed in claim 1 having a density of less than 0.04 g/cm³.

* * * * *